(12) United States Patent
Tankhiwale

(10) Patent No.: US 7,529,358 B2
(45) Date of Patent: May 5, 2009

(54) DYNAMIC FEATURE AND FUNCTION AVAILABILITY FOR SOFTWARE PBX

(75) Inventor: Kaustubha A. Tankhiwale, Ocean, NJ (US)

(73) Assignee: Avaya, Inc., Lincroft, NJ (US)

( * ) Notice: Subject to any disclaimer, the term of this patent is extended or adjusted under 35 U.S.C. 154(b) by 1243 days.

(21) Appl. No.: 10/268,002

(22) Filed: Oct. 8, 2002

(65) Prior Publication Data

US 2004/0066931 A1     Apr. 8, 2004

(51) Int. Cl.
H04M 3/42   (2006.01)
G06F 9/44   (2006.01)

(52) U.S. Cl. .................... 379/201.03; 379/201.04; 379/231; 379/234; 717/116

(58) Field of Classification Search ........... 379/201.03, 379/331–234, 201.04, 231; 717/116
See application file for complete search history.

(56) References Cited

U.S. PATENT DOCUMENTS

| | | | | |
|---|---|---|---|---|
| 4,613,730 | A | * | 9/1986 | Fechalos et al. ........ 379/355.01 |
| 5,375,162 | A | * | 12/1994 | Kim et al. .................. 340/7.29 |
| 5,410,593 | A | * | 4/1995 | Kamota ....................... 379/393 |
| 5,416,831 | A | * | 5/1995 | Chewning et al. ........ 379/93.25 |
| 5,455,854 | A | * | 10/1995 | Dilts et al. ............. 379/201.04 |
| 5,535,262 | A | * | 7/1996 | Kanzawa ................. 379/88.25 |
| 5,546,454 | A | * | 8/1996 | Harrington ............. 379/266.01 |
| 5,590,189 | A | * | 12/1996 | Turnbull et al. ........ 379/355.05 |
| 5,631,901 | A | * | 5/1997 | Nishida ....................... 370/384 |
| 5,797,124 | A | * | 8/1998 | Walsh et al. ................. 704/275 |
| 5,875,242 | A | | 2/1999 | Glaser et al. |
| 6,061,512 | A | * | 5/2000 | Lin et al. ..................... 717/168 |
| 6,115,041 | A | * | 9/2000 | Dang et al. .................. 715/767 |
| 6,240,326 | B1 | * | 5/2001 | Gloudeman et al. ........... 700/83 |
| 6,370,149 | B1 | * | 4/2002 | Gorman et al. ............. 370/419 |
| 6,452,929 | B1 | * | 9/2002 | Israelsson ................... 370/400 |
| 6,661,879 | B1 | * | 12/2003 | Schwartz et al. ......... 379/88.25 |
| 6,757,372 | B1 | * | 6/2004 | Dunlap et al. .......... 379/142.17 |
| 6,836,545 | B1 | * | 12/2004 | Abe et al. .................... 379/393 |
| 2002/0085696 | A1 | | 7/2002 | Martin et al. |

OTHER PUBLICATIONS

Douglas C. Schmidt et al., "An Object-Oriented Framework for Dynamically Configuring Extensible Distributed Systems," BCS/IEE Distributed Systems Engineering Journal (Special Issue on Configurable Distributed Systems), 1995, pp. 1-15.

Brochure, "Avaya IP Softphone R2—An IP Phone for Your Workspace on the Road, Home and Office," © Avaya Inc.

* cited by examiner

*Primary Examiner*—Fan Tsang
*Assistant Examiner*—Simon Sing
(74) *Attorney, Agent, or Firm*—Muncy, Geissler, Olds & Lowe, PLLC

(57) ABSTRACT

A system and method for controlling a communications system that dynamically provides context sensitive functionality. In one embodiment, the system comprises a Private Branch Exchange (PBX) connected by communications channels to one or more communications devices and controlled, in part, by software objects that provide functionality that varies dependent on the hardware and software currently available and the status of that hardware and software. In one embodiment, the user of the communications device is presented, by way of an addressable display and associated function buttons, with only the function options appropriate to the context in which they are currently using the system. For instance, a conference option only becomes available when more than one incoming call is made to the same telephone.

28 Claims, 4 Drawing Sheets

DYNAMIC FEATURE AND FUNCTION AVAILABILITY FOR SOFTWARE PBX

FIELD OF THE INVENTION

The present invention pertains to communications systems and, more particularly, to systems and processes for providing dynamically available features and functions to private branch exchanges.

BACKGROUND OF THE INVENTION

The ability to communicate quickly, easily and efficiently is critical to successful business operations. The telephone system continues to be a crucial element in enabling that communication. However, today's computer literate business users demand significantly more functionality from their communications systems than the early users did one hundred years ago. Not content with simply being able to place and receive calls easily, modern users are continually looking for more functionality. They want telephone systems that can conference, switch and pool calls, give them access to advanced features including call accounting, voice messaging, automatic call distribution and interface with their computer systems and networks.

This continual demand for more functionality places increasing demands on the equipment that supports the telecommunications systems. To keep pace with changing user requirements, key components such as Private Branch Exchange switches (PBXs) and the telephones themselves, are in constant need of redesign and upgrading. As most modern PBX systems are programmable digital systems, controlled by software, this pressure for new features translates into a continual need for programming changes. Alteration to complex software typically requires intensive and time consuming testing to ensure reasonably error free product deployment. This testing is often significantly more time consuming and expensive than the actual re-programming.

Adding new features also places unique demands on both the communications device itself and the users of the device. A typical communications device, such as the telephone, is designed to be a compact, easy to operate device. Having a multitude of dedicated buttons or keys that enable particular features or functionality can result in telephones that are cumbersome, intimidating and require significant effort to learn to use. Existing communications systems have predetermined physical maps between buttons and functions. There are significant cost and logistics disadvantages in having to change phone models, or the tag labels that map buttons to functions, to accommodate new functionality.

Modern communications and telephony equipment, particularly PBXs, are already built as software controlled switches using Object Oriented Programming (OOP) languages). OOP was intended to simulate the way humans interact with different types of objects, as described for instance in "The C++ Programming Language, Third Edition", by Bjarne Stroustrup, Addison-Wesley, Reading, Mass., USA, 1997, ISBN #0-201-88954-4, the contents of which are hereby incorporated by reference. However, the new technology of OOP is typically used merely to provide more traditional functionality and does not take advantage of the possibilities offered by OOP. In particular, OOP techniques provide the ability to monitor the creation of software objects. When such objects are created they can be listed as inventory. Based on the inventory of all types of objects, different features can be made available. Moreover, such OOP provision of context sensitive functionality also allows the user to only see currently available options relevant to what they are actually doing.

There is a clearly a need for a communications control system and associated hardware that can change functionality without significant programming effort, and present the new functionality to end users in an intuitive manner that requires little learning, and avoids having to install new telephones or tag labels. In particular, there is a clear need to leverage the advantages of OOP to provide communications control system having context sensitive functionality.

SUMMARY OF THE INVENTION

The invention of this application is a communications control system that provides context sensitive functionality. At the user end this entails having a communications device with context sensitive function buttons which present the user only the functions that make sense in the current context. At the switching center or PBX, object oriented programming is used to monitor existing connections and provide each of them only the functionality that is appropriate to the current situation.

In one embodiment, the system of this invention comprises a programmable switching center, such as, but not limited to a programmable Private Branch Exchange (PBX), controlling a network of connections or communications channels. The connection channels, which may for instance be, but are not limited to, conventional telephone lines or wireless telephone links or a combination thereof, connect the switching center to a plurality of telephones or other related communications devices. In one embodiment of the invention, the communications devices, which may for instance be conventional telephones, cordless telephones or wireless telephones, or some combination thereof, have, in addition to their inherent audio input and output capabilities, an addressable display and programmable feature buttons. The programmable feature buttons may be in addition to or instead of more conventional, dedicated function buttons or they may be virtual function buttons on the display.

In a further embodiment of the invention, the communications control system is programmed in an appropriate object oriented software language, such as but not limited to Java, C++ or C#, in such a way as on to have one or more connection software objects. Such a connection software object provides the necessary methods and other software code to enable the switching center to support the connection of one communications device to one or more other communications devices by way of one of the communications channels. The connection software object also reports on the status of the connections it makes, including reporting on such attributes of the status as, for instance, types and number of telephones involved in the connection.

In this embodiment, the switching system of this invention also has one or more telephone software objects, also programmed via an appropriate software language. The telephone software object provides the necessary methods and other software code to support the functioning of one or more of the connected communications devices as a traditional telephone, allowing at least audio-to-audio communication. The telephone software object does this by interpreting the status of associated connection software objects and in response making available suitable telephone functions. The user is made aware of which functions are available by means of a display, and is able to initiate the choice of any such available function by means of function buttons. These function buttons may be actual buttons, or they may be virtual buttons on a touch screen or some combination of the two. The state of the function buttons are monitored by the telephone software object and used, in part, to provide the necessary telephony functions required by the user.

The system of this invention provides a number of improvements over the prior art, including the following:

New functionality can be added without having to replace existing communications devices;

Having context appropriate functionality displayed helps the user operate efficiently and effectively; and Changing functionality through software objects in such a system means that only the new objects need be added and tested.

The system of this invention provides a way of doing the best with what is available in a given system by having the software make the decision on what functionality to provide.

BRIEF DESCRIPTION OF THE DRAWINGS

FIG. 5 is an illustration of a specific use scenario of one embodiment.

DETAILED DESCRIPTION

During the course of this description like numbers will be used to identify like elements according to the different figures that illustrate the invention.

To understand the functioning of the software objects involved in this invention, it is useful to consider the context in which they are implemented and operate.

Figure 1:
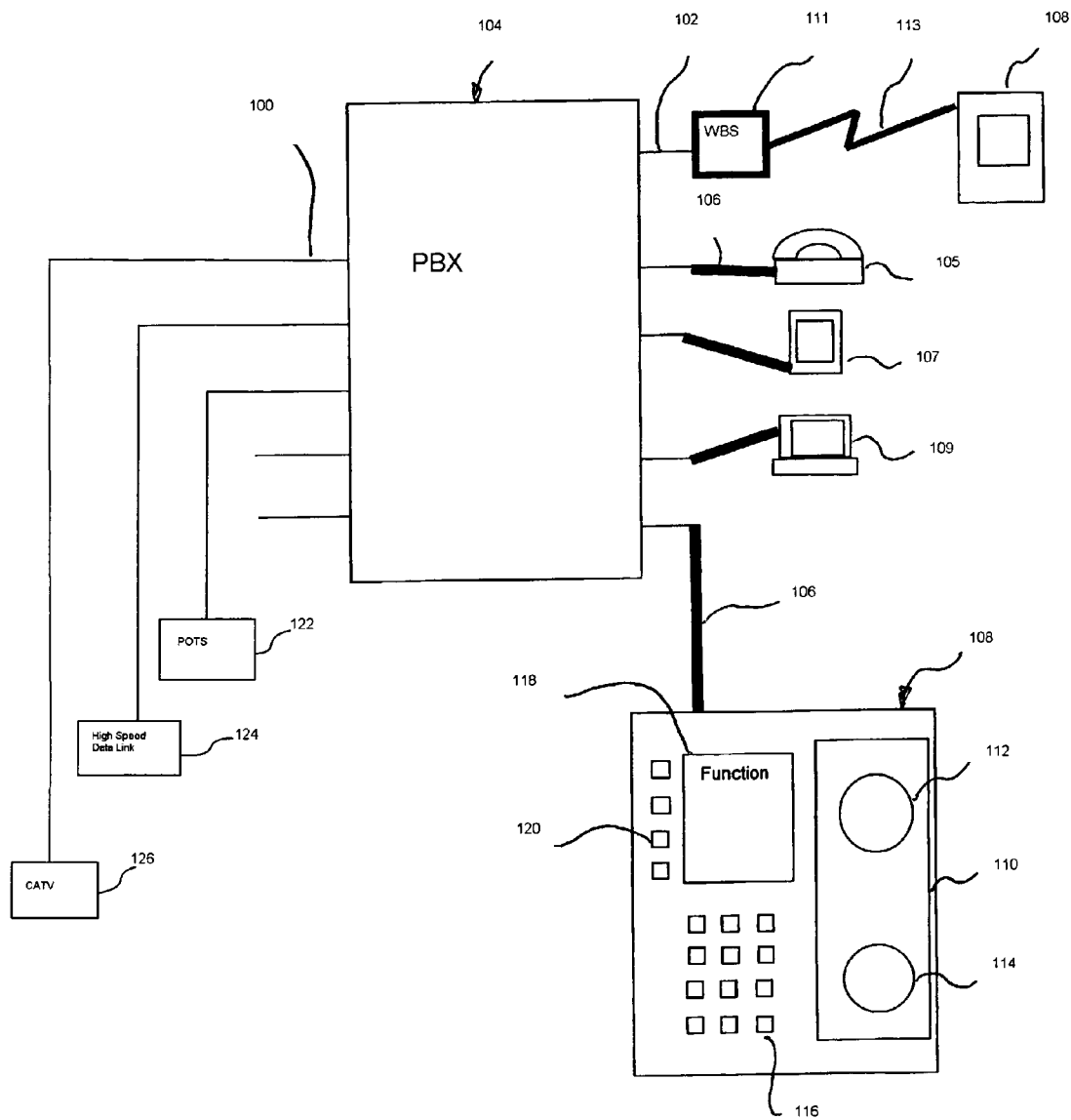
FIG. 1 is a schematic overview of one embodiment of a communications control system.

One embodiment of a communications switching system is shown in FIG. 1. The system comprises a plurality of external connections 100 and internal connections 102, all attached at one end to a Private Branch Exchange switch (PBX) 104, which may for example be, but is not limited to, an Avaya DEFINITY PBX unit such as the Avaya DEFINITY Single Carrier Cabinet (SCC-1) running DEFINITY R10.5 software, or the Avaya G700 Media Gateway with an Avaya S8700 Media Server running MultiVantage 1.1 software. At the other end, the external connections 100 may be attached to variety of communications channels such as, for instance the Plain Old Telephone System (POTS) 122, a high-speed data link 124 or a suitable cable TV network (CATV) 126. At the other end, the internal connections 102 may be attached via suitable communications channels 106 to a variety of communication devices, such as, but not limited to a regular telephone 105, a wireless base station 111, a personal data assistant 107, a computer 109 or a context sensitive telephone unit 108. A context sensitive telephone unit 108, which may be, but is not limited to, an Avaya 4620 telephone or an Avaya 9631 wireless/cordless phone, is shown attached to one of the internal connections 102 by connection channel 106. Another context sensitive telephone 108, which may for instance be an Avaya Model 9631 wireless/cordless phone, is show wirelessly connected to the PBX 104 by way of a base station 111. In this instance the connection channel 106 may be thought of as comprising both the wireless link 113 and the base station 111. The context sensitive telephone unit 108 has generic features such as a hand piece 110 comprising a speaker 112 for audio output and a microphone 114 for audio input, as well as a one or more function buttons 116. In addition the telephone unit 108 has a display 118 capable of displaying graphic indicators such as icons and/or alphanumeric characters. The telephone unit 108 also has one or more programmable function buttons 120.

Although, for simplicity, only two context sensitive telephones 108 are shown in FIG. 1, it is understood that in practice a plurality of such telephones may be connected to the branch exchange switch 104 and that a plurality of such telephones may also be connected to a single wireless base station 111. Similarly, although the context sensitive functionality is described here by reference to its use in a context sensitive telephone 108, it will be readily appreciated that the system of this invention could apply to systems comprising other communication devices, when suitably enabled for voice input and output, including most electronic communication devices such as, but not limited to Personal Data Assistants (PDA) 107 and computers 109, or some combination thereof. Additionally, one skilled in the art will appreciate that although the communications channels 106 are shown as a simple cable, the invention applies equally to systems in which such communications channels are wireless channels or acoustic channel or some combination of physical, acoustic wireless channels or connections. Similarly the internal and external connections would be via any of the well known structures for conveying data including, but not limited to, standard telephone lines, twisted pair metal wire, co-axial wire, fiber optic lines, cordless or wireless transmission.

Figure 2:
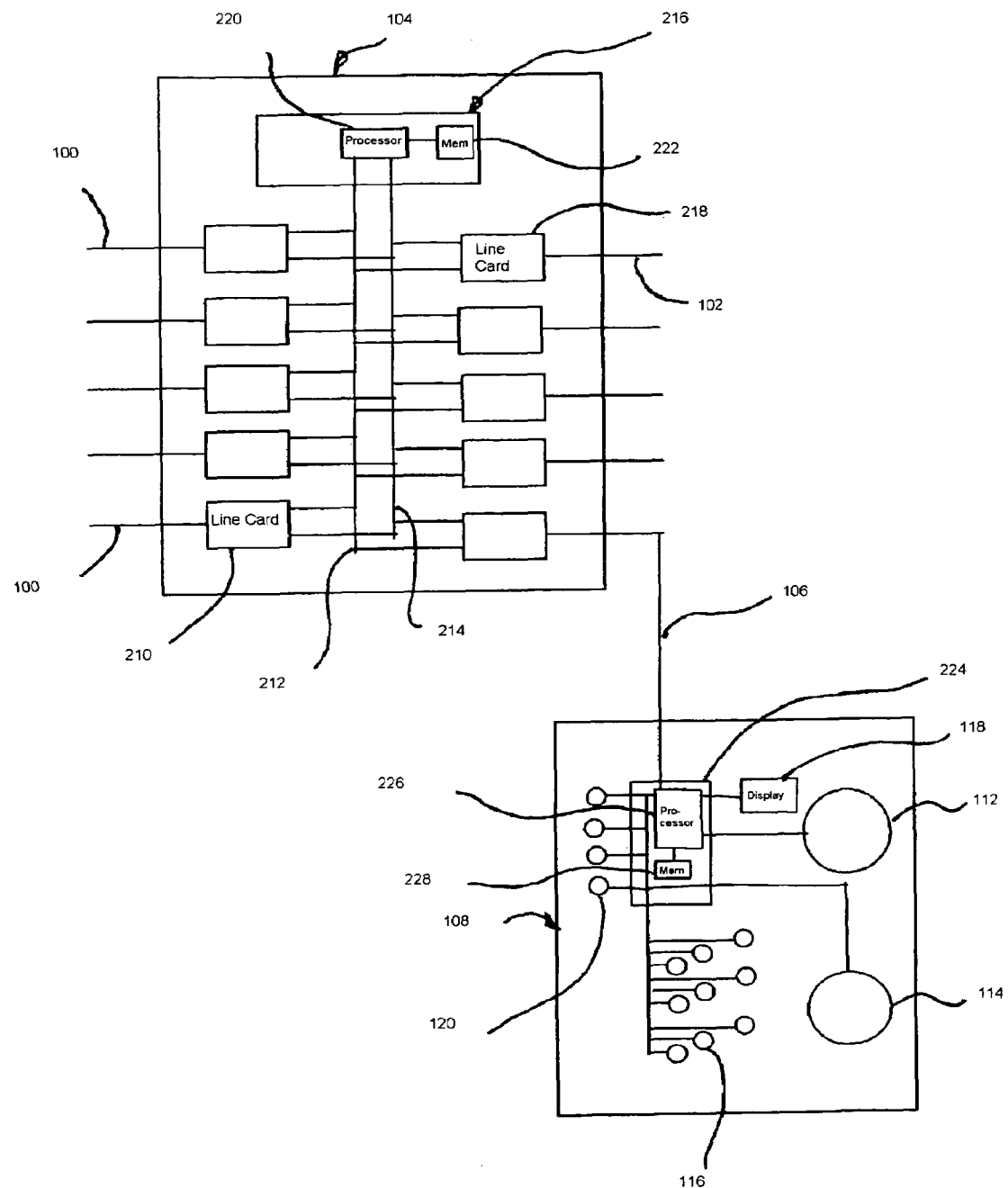
FIG. 2 is a schematic illustration of one embodiment of the functional components of a communications control system.

FIG. 2 shows a schematic illustration of one embodiment of the functional components of a representative communications system. External connections 100 are connected to external line cards 210. These external lines 210 cards, which may be but are not limited to Avaya model TN742 analog line cards or Avaya TN464F DS1 interface T1 Trunk cards, are connected to a control bus 212 and to a switching bus 214. Both buses 212 and 214 are also connected to a system controller 216, which may for example be an Avaya TN2314 processor. Such a system controller typically comprises at least a processing unit 220, which may be a programmable micro-processor, such as but not limited to an Intel Pentium II processor and an electronic storage unit or memory 222. Switching bus 214 is also connected to one or more internal line cards 218, which may for example be, but is not limited to, an Avaya TN2224B 2W Digital line card.

As shown in FIG. 2, an internal line card 218 is typically connected by an internal connector 102 and a communications channel 106 to a phone control module 224. The phone control module 224 typically comprises a phone processing unit 226, which may for instance be a micro-processor, such as an Intel StrongARM processor and an electronic storage unit or phone memory 228. The phone control module 224 is functionally linked to the phone components, such as a speaker 112, a microphone 114, function buttons 116, a display 118 and the programmable function buttons 120.

Figure 3:
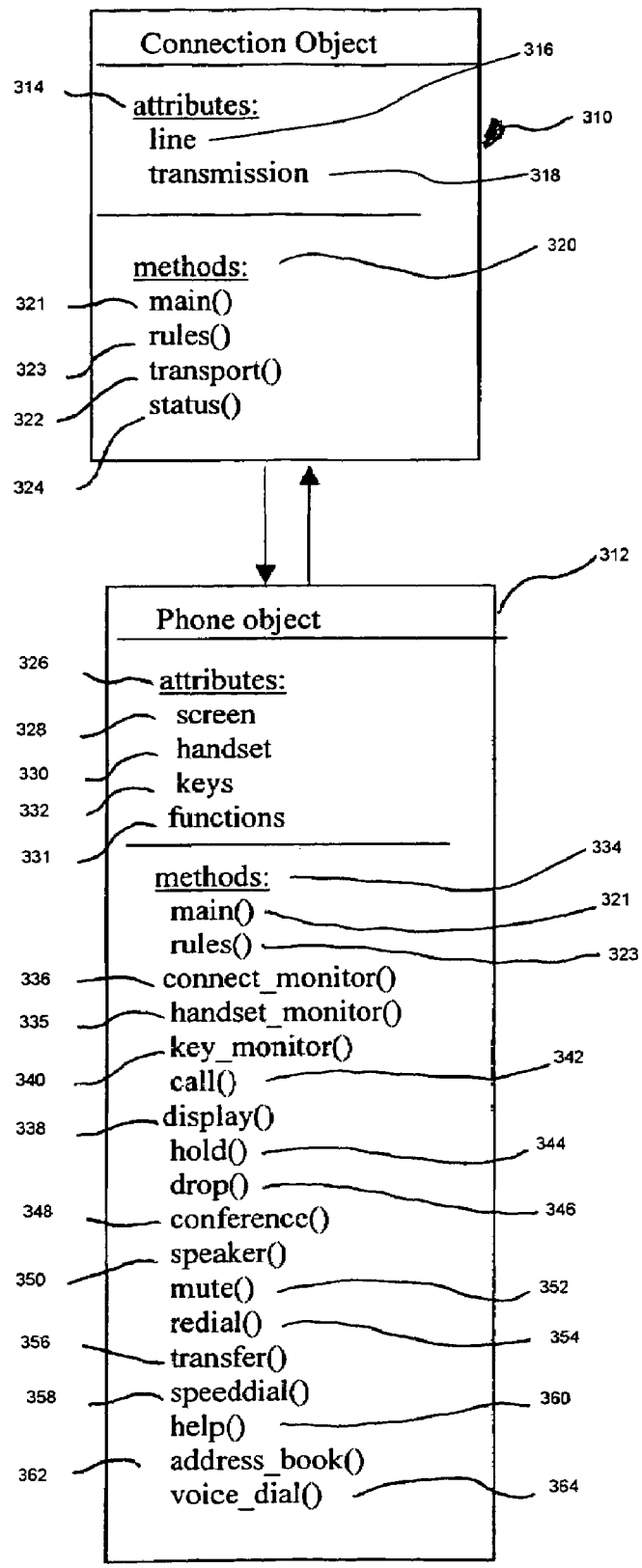
FIG. 3 is a schematic illustration the functional software objects of one embodiment of a communications control system.

FIG. 3 is a schematic illustration of the functional software objects of one embodiment of a communications control system. These software objects are electronic switch setting instructions or computer code modules, which typically reside in compiled form in one or more of the system processing unit 220, the system memory 222, the phone processing unit 226 or the phone memory 228. These software objects provide appropriate functionality to the communications system, by means of setting or controlling appropriate switches, such as but not limited to transistors, in the system controller 216 and the phone control card 224.

The Connection software object 310 is a block of computer code, written or generated in a suitable object oriented programming language such as, but not limited to, Java, C++ or C#, or a machine interpretable equivalent thereof, and complied to a form suitable for interpretation and use by processing unit 220. Like most software objects, the connection object 310 comprises connection attributes 314, which may be of varying scope including public or private, and connection methods 320, which may also be of varying scope, including public or private. Attributes are typically constants or variables in alpha-numeric, numeric or Boolean form. The connection attributes 314 include, but not limited to a line attribute 316 and a transmission attribute 318. A line attribute 316 may for instance identify the internal connections 102 and external connections 100 that the connection object 310 is handling, including mappings and routings between such connections. A transmission attribute 318, may for instance identify bandwidths, protocols, priority and timing parameters associated with those connections.

The connection methods 320 are algorithms for performing specific functions, such as but not limited to a main( ) method 321, a rules( ) method 323, a transport( ) method 322 and a status( ) method 324. The main( ) method of an object is usually the controlling method and may include suitable inventory and control functions. The transport( ) method 322 may for instance, but is not limited to, include algorithms or instructions for handling data transfer between one or more external line cards 210 and internal line cards 218. The status( ) method 324 may for instance include algorithms that monitor and report on various parameters associated with the connection, including, but not limited to, bus availability, data rates, hardware and software component availability. The rules( ) method may for instance operate like a Rule Book or a recipe book, being a set of criteria required before a specific function is implemented.

The telephone software object 312 is also a software object, i.e. a set of machine executable instructions generated from object oriented computer code. Such object oriented computer code may be instructions written in a suitable programming language, such as, but not limited to Java, C++ or C#, or a machine interpretable equivalent thereof, and, when necessary, complied to a form suitable for interpretation and use by processing unit 220 or phone processing unit 226.

As its names suggests, the purpose of the telephone object 312 is to provide at least the functionality of a traditional telephone to a communications device, that is to enable the device to operate so as to allow voice-to-voice communication. This voice-to-voice communication may take the form of traditional fixed line voice communication using Plain Old Telephone System (POTS) protocols or it may be enabled through packet switching as in a typical Voice over Internet Protocol (VoIP).

To do this, the telephone object 312 has a number of telephone attributes 326, including, but not limited to, a screen attribute 328, a handset attribute 330, a functions attribute 331 and a keys attribute 332. Typical variables kept or kept track of by such attributes may for instance include, but are not limited, screen attribute 328 indicating resolution, color mapping and refresh rate, handset attribute 330 indicating volume and/or tone settings, functions attribute 331 indicating available hardware options for the particular phone model and keys attribute 332 indicating number, type and addresses or other identifiers of keypads.

The telephone object 312 also has a number of telephone methods 334, including but not limited to a main( ) method 321, a rules method 323, a connect_monitor( ) method 336, a handset_monitor( ) method 335, a display( ) method 338, key_monitor( ) method 340, call( ) method 342, hold( ) method 344, drop( ) method 346, conference( ) method 348, speaker( ) method 350, mute( ) method 352, redial( ) method 354, a transfer( ) method 356, a speed_dial( ) method 358, a help( ) method 360, an address_book( ) method 362 and a voice_dial( ) method 364.

Each of these methods is capable of implementing some appropriate functionality. For instance the connect_monitor( ) method 336 causes the phone processing unit that it is associated with to monitor status and other information from the appropriate internal line card 218. The display( ) method 338 is capable of causing graphic or alpha-numeric characters to be displayed appropriately on the electronically addressable display 118. The key_monitor( ) method 340 is capable of servicing both the function buttons 116 and programmable function buttons 120 by responding to user input to them and outputting appropriate instructions, such as, but not limited to, calling another method or altering an attribute.

Although the various functions have been shown as being methods of a particular software object, in an alternative embodiment the system could also have been architected to have the connection object and/or phone object be container class objects and have one or more of the methods implemented as separate software objects contained within that class.

Figure 4:
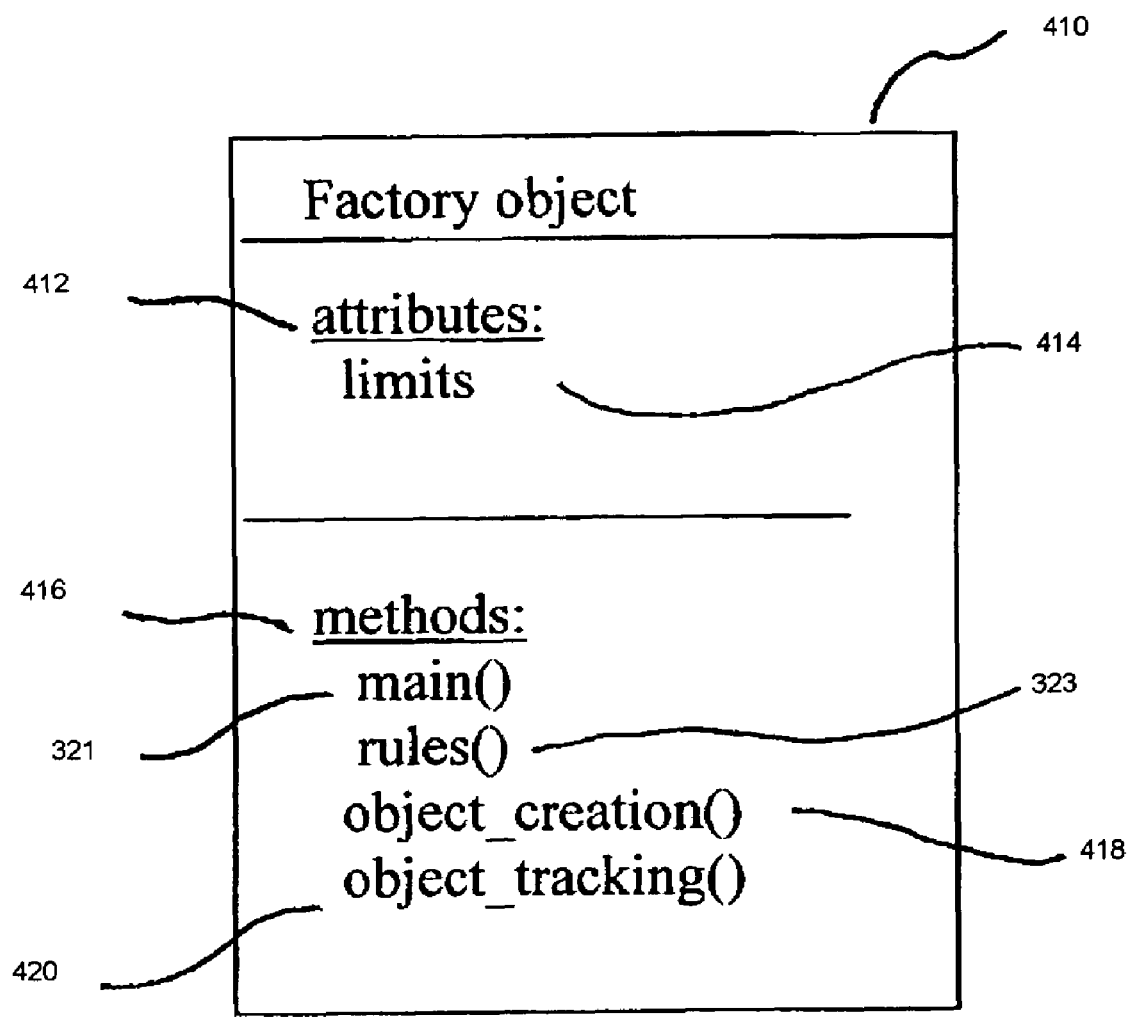
FIG. 4 is a schematic illustration of a factory object.

FIG. 4 is a schematic illustration of an additional embodiment of the invention which employs a factory object 410. A factory object is an optional software object residing in a suitable form and location, such as, but not limited to, machine code in random access memory, on either the system controller 216 or the phone control card 224. The factory object 410 has factory attributes 412, such as but not limited to a limit attribute 414, which may for instance keep provide or keep track of parameter related to the total number of types of objects which may be created. The factory object 410 also has factory methods 416, such as, but not limited to, a main( ) method 321, a rules( ) method 323, an object_creation( ) method 418 and an object_tracking( ) method 420. The Object_creation( ) method 418 is designed to create objects in response to input from the system or calls from other objects. For instance, object_creation( ) method 418 is capable of, but not limited to, creating instances of the connection_object( ) 310 and the phone_object( ) 312. This includes the ability to create instances of connection_objects( ) 310 and telephone_objects( ) 312 which have subsets of the total available attributes and methods usually available to such objects, depending on the parameters feed to or gathered by the factory object 410 and/or the context sensed by some or all of the objects involved. Such sensing may for instance be performed, or performed in part, by the factory object 410's object_tracking( ) method 420. The object_tracking( ) method 420 also includes the ability to inventory objects accessible to either the system controller 216 or any connected phone processing unit 226.

The functioning of the context sensitive, dynamic feature communications system of this invention may be understood by following a representative example of use of one embodiment. FIG. 5 illustrates a series of screens that become available to a user in the course of a representative use of the system of this embodiment.

FIG. 5*a* shows a screen displaying streaming stock information and represents the display in an idle state, when the phone hand piece 110 is attached to the phone and no calls are trying to access the phone. The streaming stock information is meant to be representative of data or advertising which could be streamed to the phone's electronically addressable display in the idle state. This data could be coming via the connection 106 or could be stored locally and in addition to text or video data may be, but is not limited to, any suitable screen saver, advertising logo or other text, icons or combination thereof.

The user then picks up the phone hand piece 110 and the display changes to that shown in FIG. 5b, in which a number of available functions are now displayed along side the programmable function buttons 120. In FIG. 5b the available functions are New call, Redial Recent, Speed Dial, or Help. These functions are representative of the types of functions that may become available and not an exhaustive list. These functions have come to be displayed in the following way. In the idle state, a telephone object 312 is running on phone control card 224. In the idle state, the phone object is typically running the monitoring methods, such as, but not limited to, the connect_monitor( ) method 336, the key_monitor( ) method 340 and the handset_monitor( ) method 335. When the handset is lifted, the handset_monitor( ) method 335 detects this and makes the information available to the phone main( ) method 321. The telephone main( ) method 321 then responds to the handset_monitor( ) method 335, by for instance, calling the display( ) method 338 and key_monitor( ) method 340 using for the parameters available in the handset 330, functions 331, keys 322 and screen 328 attributes. By this means the main( ) method 321 causes the appropriate text or icons to be displayed on the display 118 and maps or associates each of the programmable function buttons 120 with the appropriate method, namely one of the call( ) 342, redial( ) 354, speed_dial( ) 358 and help( ) 360 methods. There may also be the option at this point for the user to simply dial the telephone number wanted at this point and have the telephone object interpret the dialing correctly as requiring setting up a connection to that number.

If the user now wants to make a "New call" rather than redial a recent call or use the speed dial, they simply press the programmable function button 120 that is aligned with the text or icon for "New call". The key press is detected by the key_monitor( ) method 340 and feed back to the phone main( ) method 321. Main( ) 321 then uses appropriate attributes and information from the other monitor programs to deduce what functional options are now available to the user and displays them on the addressable display. In this representative example, as illustrated in FIG. 5c, the user is presented with the options of making the new call by means of an address book, by keying in the number or returning to the previous menu. A voice dial option is not shown because, in this representative example, it is not currently available to this user. This may for instance be because the particular phone hardware that the user has is determined from the attributes not to possess sufficient computer power to handle the voice recognition functions, even though this option may be available to another user with a different handset. Or it may for instance be that this particular voice dial option is only available to this user when the branch exchange system controller 216 has sufficient space processing power available to perform voice recognition on the audio input.

By pressing the appropriate key, the user selects to place a call from her address book. Screen 5d is then presented to the user, allowing them to access names from a stored address book using a combination of the standard telephone function buttons 116, which are typically marked with numbers and letters, and the programmable function buttons 120, which now enable scrolling through the address book names. Once again the functionality is being provided by the telephone-software object 312 activating appropriate methods using data from other method and attributes.

When the desired party is found, the phone call is place by the user pressing the appropriate function button. This action is detected by the key_monitor( ) method 340, and used by the call( ) method 342 to now interact with a connection software object 310 running on the system controller 216. Connection software object 310, which may be a new object generated by a factory object running on the system controller 216 in response to the call( ) method 342 or other methods of the telephone software object 312, or may be a preexisting connection software object 310. The connection software object 310 uses the parameters made available to it to select the appropriate connections and to facilitate the desired call. Once the desired call is set up an operational, a screen such as that shown in FIG. 5e is displayed to the user. Screen 5e shows the name and number of the person being called and gives the user the option to end the call.

In the example illustrated in FIG. 5, while the call is proceeding, a third party attempts to contact the user. The attempt by the third party is detected and interpreted by the status( ) method 324 of the connection software object 310, which relays the information and the system options available given the current status of the branch exchange switch 104 to the telephone software object 312. The telephone software object 312 interprets these options and displays them to the user. FIG. 5f shows a representative screen that may be available under such circumstances. The user is shown two callers A and B, A being the one identified as being currently spoken to and B being identified as wanting to talk to the user. The user is also shown four representative options. The first is Hold A, which would allow user to speak to B privately. The second is Conference A, B and self, which would allow all three parties to talk to each other. The third option is Place B in voice mail, which would allow the user to continue to talk to A uninterrupted. The forth option available is to End A, talk to B.

In the representative example illustrated in FIG. 5, the user may select option four, and by pressing the appropriate button, cause the telephone software object 312 and connection software object 310 to end the call to A and establish a connection to party B. The caller then has a screen similar to screen 5e displayed to them, but showing the identity and number of caller B, if available, and giving the caller the option to end the call by pressing the appropriate key.

In the representative scenario above, the telephone software object 312 was described as running on the phone control card 224 or some suitable electronic component thereof. It is also be possible to have telephone software object 312 reside and operate on the branch exchange switch 104's system controller 216 or some suitable electronic component thereof It is also possible to have telephone software object 312 reside and operate on some other electronic device, such as but not limited to, a telephone or computer, which is connected to branch exchange switch 104 and provide the appropriate functionally remotely. Similarly, the connection object was described above as residing and operating on the branch exchange switch 104's system controller 216 or some suitable electronic component thereof. The connection object 310 could also reside and operate on some other electronic device, such as but not limited to, a telephone or computer, which is connected to branch exchange switch 104 and provide the appropriate functionally remotely.

In the representative example above, user choices are described as being made by pressing keys. Such choices could also be made by other input means, such as, but not limited to voice or audio commands serviced by well known voice recognition or audio processing technology, by pressure sensitive touch screen technology or controlled cursor. Such choice could also be made via applications and such applications need not be on the phone but may be running on a Personal Computer (PC) or Personal Data Assistant (PDA) which has access to the Private Branch Exchange (PBX).

The representative example above illustrates one specific example of how the user experience can be customized through real-time object inventory. As can be seen from the example above, this method of providing telephone and telephone related functionality is significantly different from traditional telephony in which functionality is fixed. In a traditional system, there are dedicated buttons for functions such as hold, transfer and conference whether or not they are need or applicable. As phone buttons take up valuable space, it is advantageous to have only what is necessary, available. There is no need, for instance, to have a redial button when a call is already active and in progress. The context sensitive features of this invention, implemented the manner exemplified above, have clear advantages, including ease of use and reduced need to upgrade hardware.

This embodiment of a communications system for providing context sensitive features and function can be understood from some basic object oriented software concepts. One of these concepts is the ObjectFactory, which is a typical OOP construct capable of creating instantiations of other software objects. An ObjectFactory also usually keeps count of the objects. Object hierarchy is defined by the particular object oriented design. For example, a particular phone set model behaves as a generic phone. Therefore generic telephone features are available at the specific phone set level. For instance, all telephones have a minimum set of features, such as answer, make a call and hang up. All telephones, whether it is a simple single line set or the newest IP telephone with web interface, can be derived from a generic phone set object that defines that minimum set of features. The implementation may be different in different sets, and some sets may add to the existing functionality, but the end results of the common features will be the same.

Container classes are another OOP concept. These provide a grouping of objects, putting them into a context. For instance, rather than having a single telephone object with a multitude of methods as shown in FIG. 3, there could be a PhoneSet object containing a plurality of other objects, such as Button objects and Display objects, each of which may for instance be one way of implementing the related methods described above.

In one embodiment of the invention context sensitive features and functionality are implemented by providing an ObjectFactory for each object which keeps track of each object created and the user of the object. The object factories create the common objects, such as Call, PhoneSet, Button and many others. Object names depend on the architecture specifics. The Factory Object 410 is a specific example of such an ObjectFactory.

An InventoryManager will keep track of the creations of the different Factories. All Container classes typically have an Inventory Manager. For example a phone set's object representation has an InventoryManager, as does a line card's or an entire PBX's. For instance, the telephoneobject 312 and the Connection object 312 may have such an inventory manager as an integral part of the main( ) method or rules( ) method.

In a further embodiment, each container class also has a RuleBook. This functions something like a recipe book. The RuleBook is essentially a set of criteria required for a specific feature. For example, the RuleBook for a phone set may have the following entries:
 Hold: Call.State IN{Active}
 Drop: {Call.State IN{Active}} OR {Call.State IN{Conference}}
 Speaker: Call.State IN{Active; Held:Incoming: Ready-To-Call}

Based on the RuleBook entries for a particular object, different features are available at different times to different users. This provides customization based on user capabilities and the current state of the system. It also provides a dynamic list of available features at any time. Specific examples of implementations of a RuleBook are, for instance, the rule( ) methods of both Connection object 310 and the Telephoneobject 312.

The benefits of this approach are significant.

Firstly, the list of available features at any given time or in any given circumstance is almost always significantly less than the total list of system features. This means that display the available list takes up significantly less space or "real estate" on the display screen. It also means, that if soft keys are desired, there is less screen space needed for soft keys. This means that even in a feature rich system, all the features can be accessed via soft keys.

Another advantage is that RuleBook entries can be modified by software upgrade in a manner that has significant savings. If new functionality is delivered by adding RuleBook entries and objects that perform the new functions, existing functionality is untouched. This means that development effort can be concentrated on adding functionality rather than trying to maintain existing or current functionality. It also means that heavy regression testing is not needed since the existing implementation is untouched.

Some further examples of Rulebook entries are:
 MakeCall: Call.State IN{Ready-To-Call}
 Hold: Call.State IN{Active}
 Mute: Call.State IN{Active; Muted}
 Drop: Call.State IN{Active; Conference}
 Speaker: Call.State IN{Active; Held: Incoming: Ready-To-Call}
 Redial: Call.State IN{Ready-To-Call }
 Abbreviated Dial: Call.State IN{Ready-To-Call }
 Transfer: Call.State IN{Active }
 Conference: Call.State IN{Active; Conference} OR {Call.State IN{Active; Conference} AND Call.State IN{Incoming}}
 Park: Call.State IN{Active}
 Park Retrieve: Call.State IN{Park} AND Call.State IN{Ready-To-Call}
 Send All Calls: PhoneSet.SAC.State IN{SendAllCalls}
 Forward: Call.State IN{Unanswered} OR {User.ForwardFeature.Active =TRUE AND User.ForwardFeature.Destination!=NULL}6*The second conditional is for when a user is on an active call and wants to conference the incoming call immediately with the active call. This is typical for conference room phones.

In an additional embodiment of the invention, features involving different RuleBooks and Inventory Managers can also be implemented. For example, the PBX container class may make additional features that relate to service observation or monitoring and Automatic Call Distribution (ACD) available:
 Service Observe: ThisUser.Call.State IN{Ready-To-Call} AND ThatUser.Call.State.IN{Active}
 Vectoring: ACDQueue.State.In{Incoming} AND ACD.AgentPool.Available IN {7001,7002,7004}

In another embodiment, the Connection objects or TelephoneObjects may additionally facilitate functions such as, but not limited to voice in, text out, or text in voice out messaging.

In a further embodiment, the Connection objects or Phone Objects may additionally facilitate functions such as language translation as part of the transfer( ) method.

In a further embodiment, the Connection objects or Phone Objects may additionally facilitate functions useful to call centers such as automatic call distribution, which may for instance be customized based on parameters such as, but not limited to time of day, caller id, caller credit rating, caller location or address.

In a further embodiment, the Connection objects or Phone Objects may additionally facilitate personal call routing or customized forwarding, which may for instance be customized based on parameters such as, but not limited to time of day, caller id, caller location or address.

In a further embodiment, the Connection objects or Phone Objects may additionally facilitate functions such as speed dialing which may for instance be customized based on parameters, whereby for instance, depending on the time of day, the speed dial numbers may relate to different office or home lists, or the office list may reach different geographic locations, which may be different international divisions.

In a further embodiment of the invention service such as, but not limited to speed dial and address lists, may be referred to by icons, photos, or thumbnails in addition to, or instead of alpha-numeric text.

Although the invention has been described with reference to specific embodiments, it is understood that the invention can be readily adapted to provide a wide range of functionality by contexts such as, but not limited to other calls, time of day, caller id or other attributes such as credit rating or location.

Although the invention has been described in terms of the illustrative embodiments, it will be appreciated by those skilled in the art that various changes and modifications may be made without departing from the spirit or scope of the invention as set forth in the appended claims.

What is claimed is:

1. A communications control apparatus, having an object oriented architecture and software objects, for providing context sensitive functionality, comprising:
    a private branch exchange, said exchange having a plurality of communications channels and a software object processor;
    at least one communications device, said communications device being connected to said exchange by one of said communications channels, and said communications device including an audio input device; an audio output device; a programmable display; a software object processor; at least one function button;
    at least one connection software object, said connection object including a connection algorithm for supporting a connection of one of said communications devices to at least one other of said communications channels; and a signaling algorithm for indicating a status of said connection; and
    at least one telephone software object, said telephone object including an interpretation algorithm for interpreting said status; a display algorithm for indicating at least one telephone function on said display; a function button monitoring algorithm, and a telephone function algorithm for invoking said telephone function;
    wherein said telephone software object permits different functions to be available at different times for different users.

2. The communications control apparatus of claim 1 wherein: said display algorithm is responsive to said interpretation algorithm; and said a telephone function algorithm is responsive to both said interpretation algorithm and said function button monitoring algorithm.

3. The communications control apparatus of claim 2, wherein said communications channels are selected from the group consisting of telephone lines, cable connections, fiber optic links, infra-red links, acoustic couplers and wireless connections.

4. The communications control apparatus of claim 3, wherein said communications device is selected from the group consisting of a telephone, a wireless telephone, a personal digital assistant, a laptop computer, a workstation and a personal computer.

5. The communications control apparatus of claim 4, wherein said telephone object further comprises: a voice recognition algorithm responsive to audio input from said audio input device; of said audio input signals; a voice activated telephone function algorithm responsive to both said voice recognition algorithm and said status.

6. The communications control apparatus of claim 5 wherein said connection software object resides on at least one of said programmable communications devices.

7. A communications system, comprising:
    a control apparatus having an object oriented architecture;
    at least one communications device, responsive to the control apparatus, having a display and at least one programmable user activated function which is displayed on the display;
    at least one connection object, responsive to the control apparatus, for monitoring a plurality of methods and attributes associated with the connections between the communications device and the communication system;
    at least one communications device object, responsive to the control apparatus, for monitoring a plurality of attributes and methods associated with the communication device, the attributes including at least a display attribute and the methods including at least one programmable user activated function;
    wherein said communications device object permits different programmable user activated functions to be displayed on the display at different times for different users.

8. The communications system according to claim 7 wherein the communications device includes a telephone having a plurality of function keys, that are disposed in proximity to the display and that are associated with the programmable user activated functions.

9. The communications system according to claim 8 wherein the communications device includes a telephone, the communication device includes a telephone object, and the attributes include at least one attribute selected from the group comprising a display attribute, a handset attribute, a function key attribute or a hardware function attribute.

10. The communications system according to claim 9 wherein the methods of the communications device object include at least one method corresponding to the user activated programmable functions selected from the group comprising a new call, redial recent, speed dial, help, address book, number, previous menu, back, scroll, a scrollable list of names, end call, hold, conference or voicemail.

11. The communications system according to claim 10 wherein the attributes of the connection object include at least one attribute selected from the group comprising a line attribute or a transmission attribute.

12. The communications system according to claim 11 wherein the methods of the connection object include at least one method selected from the group comprising a main method, a rule method, a transport method, or a status method.

13. The communications system according to claim 12 wherein when a hand piece of the telephone is picked up, the display displays the new call, the redial recent, the speed dial or the help functions next to corresponding function keys.

14. The communications system according to claim 13 wherein when the new call function is selected, the display displays an address book, a number and a previous function next to corresponding function keys.

15. The communications system according to claim 14 wherein when the address book function is selected, the display displays a back, a scroll and a scrollable list of names function next to corresponding function keys.

16. The communications system according to claim 15 wherein when a name on the scrollable list of names is selected a connection is established and the status of the connection is displayed and the end of call function is displayed next to a corresponding function key.

17. The communications system according to claim 16 wherein when a third party calls during a connection, the status of the current connection and the telephone number of the third party are displayed, and the hold, conference, voicemail functions are displayed next to corresponding function keys.

18. A method for controlling a communications system and a communications device, comprising:
  running object oriented software on a control apparatus;
  instantiating at least one connection object, responsive to the control apparatus, for monitoring a plurality of methods and attributes associated with the connections between the communications device and the communication system;
  instantiating at least one communications device object, responsive to the control apparatus, for monitoring a plurality of attributes and methods associated with the communication device, the attributes including at least a display attribute and the methods including at least one programmable user activated function;
  displaying on a display of the communications device at least one programmable user activated functions;
  wherein the communications device object permits different programmable user activated functions to be displayed on the display at different times for different users.

19. The communications method according to claim 18 wherein the communications device includes a telephone having a plurality of function keys, that are disposed in proximity to the display and that are associated with the programmable user activated functions.

20. The communications method according to claim 19 wherein the communications device object includes a telephone object and the attributes include at least one attribute selected from the group comprising a display attribute, a handset attribute, a function key attribute or a hardware function attribute.

21. The communications method according to claim 20 wherein the methods of the communications device object include at least one method corresponding to the user activated programmable functions selected from the group comprising a new call, redial recent, speed dial, help, address book, number, previous menu, back, scroll, a scrollable list of names, end call, hold, conference or voicemail.

22. The communications method according to claim 21 wherein the attributes of the connection object include at least one attribute selected from the group comprising a line attribute or a transmission attribute.

23. The communications method according to claim 22 wherein the methods of the connection object include at least one method selected from the group comprising a main method, a rule method, a transport method, or a status method.

24. The communications method according to claim 23 wherein when a hand piece of the telephone is picked up, the display displays the new call, the redial recent, the speed dial or the help functions next to corresponding function keys.

25. The communications method according to claim 24 wherein when the new call function is selected, the display displays an address book, a number and a previous function next to corresponding function keys.

26. The communications method according to claim 25 wherein when the address book function is selected, the display displays a back, a scroll and a scrollable list of names function next to corresponding function keys.

27. The communications method according to claim 26 wherein when a name on the scrollable list of names is selected a connection is established and the status of the connection is displayed and the end of call function is displayed next to a corresponding function key.

28. A communications system according to claim 27 wherein when a third party calls during a connection, the status of the current connection and the telephone number of the third party are displayed, and the hold, conference, voicemail functions are displayed next to corresponding function keys.

\* \* \* \* \*